United States Patent
Williams

(10) Patent No.: US 9,032,327 B2
(45) Date of Patent: May 12, 2015

(54) INFORMATION-ENHANCED USER INTERFACE PRESENTATION

(75) Inventor: Shane F. Williams, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1005 days.

(21) Appl. No.: 12/411,418

(22) Filed: Mar. 26, 2009

(65) Prior Publication Data

US 2010/0251165 A1  Sep. 30, 2010

(51) Int. Cl.
*G06F 3/048* (2013.01)
*G06F 17/30* (2006.01)
*G06F 3/0482* (2013.01)
*G06F 3/0485* (2013.01)

(52) U.S. Cl.
CPC ........ *G06F 17/30994* (2013.01); *G06F 3/0482* (2013.01); *G06F 3/04855* (2013.01)

(58) Field of Classification Search
CPC ................... G06F 3/0481; G06F 2203/04806; G06F 3/0484; G06F 17/30867; G06F 17/30873
USPC .......................................... 715/784; 345/684
See application file for complete search history.

(56) References Cited

U.S. PATENT DOCUMENTS

| | | | |
|---|---|---|---|
| 5,479,600 A | | 12/1995 | Wroblewski et al. |
| 6,204,846 B1 * | | 3/2001 | Little et al. ..................... 715/784 |
| 6,369,811 B1 * | | 4/2002 | Graham et al. ............... 715/764 |
| 6,476,831 B1 | | 11/2002 | Wirth et al. |
| 6,614,456 B1 | | 9/2003 | Rzepkowski et al. |
| 6,847,386 B2 | | 1/2005 | Paleiov |
| 7,328,411 B2 | | 2/2008 | Satanek |
| 7,676,759 B2 * | | 3/2010 | Carter ........................... 715/783 |
| 7,747,943 B2 * | | 6/2010 | Bargeron et al. ............. 715/235 |
| 7,903,093 B2 * | | 3/2011 | Kim et al. ..................... 345/173 |
| 2002/0122066 A1 * | | 9/2002 | Bates et al. ................... 345/786 |
| 2003/0051214 A1 * | | 3/2003 | Graham et al. ............... 715/512 |
| 2004/0216040 A1 * | | 10/2004 | Aduma et al. ................ 715/511 |
| 2006/0036942 A1 * | | 2/2006 | Carter ........................... 715/526 |
| 2006/0287974 A1 * | | 12/2006 | Mochizuki et al. ............... 707/1 |
| 2007/0192729 A1 | | 8/2007 | Downs |
| 2008/0079972 A1 | | 4/2008 | Goodwin et al. |
| 2008/0174564 A1 * | | 7/2008 | Kim et al. ..................... 345/173 |
| 2009/0177995 A1 * | | 7/2009 | Gould .......................... 715/786 |
| 2010/0050114 A1 * | | 2/2010 | Braun et al. .................. 715/788 |

OTHER PUBLICATIONS

Sad et al., Evaluation and modeling of user performance for pointing and scrolling tasks on Handheld Devices using Tilt Sensor; © 2009; IEEE; 6 pages.*

Zhai et al; Multistream input: An experimental study of document scrolling methods; © 1999; IBM; 10 pages.*

(Continued)

*Primary Examiner* — Linh K Pham

(74) *Attorney, Agent, or Firm* — Dan Choi; Judy Yee; Micky Minhas

(57) ABSTRACT

An approach is described for supplementing a scrolling region of an item user interface (UI) presentation with scrolling-region information. For example, the scrolling region can be enhanced by presented information regarding a flattened list of containers. The approach may also involve varying a representation of a collection of items displayed in an item presentation region of the item UI presentation based on at least one emphasis-related attribute associated with the collection of items. The various features of the item UI presentation facilitate a user's navigation through a large collection of items.

9 Claims, 10 Drawing Sheets

(56) References Cited

OTHER PUBLICATIONS

Kaptelinin, et al., "Transient Visual Cues for Scrolling: An Empirical Study," CHI '02 Extended Abstracts on Human Factors in Computing Systems, 2002, pp. 620-621.

Laakso, et al., "Improved Scroll Bars," CHI '00 Extended Abstracts on Human Factors in Computing Systems, retrieved at <<http://www.cs.helsinki.fi/u/salaakso/papers/CHI2000-Improved-Scrollbars.PDF>>, 2000, 2 pages.

Klein, et al., "Benefits of Animated Scrolling," retrieved at <<http://hcil.cs.umd.edu/trs/2004-14/2004-14.pdf>>, 6 pages.

Byrd Donald, "A Scrollbar-based Visualization for Document Navigation," retrieved at<<http://citeseerx.ist.psu.edu/viewdoc/download;jsessionid=D60392C39CDF3DEA3BC1B3F55A4-2F33A?doi=10.1.1.21.4786&rep=rep1&type=pdf>>, 1999, 8 pages.

Microsoft Word screen shot showing scroll bar, generated May 25, 2009, Microsoft Corporation, Redmond, Washington, 1 page.

Windows Life Photo Gallery screen shot, retrieved at <<http://img166.imagevenue.com/img.php?loc=loc528&image=05021_tabel_of_contents_122_528lo.jpg>> on Mar. 25, 2009, 1 page.

Page entitled "Download Photoshop Album Starter Edition 3.2," retrieved at <<http://www.adobe.com/products/photoshopalbum/starter.html>> on Mar. 25, 2009, Adobe Systems Incorporated, San Jose, California, 1 page.

\* cited by examiner

INFORMATION-ENHANCED USER INTERFACE PRESENTATION

BACKGROUND

A user may have access to a large archive of digital items, such as photographs, documents, songs, and so on. Further, a user may also have access to complex items that include multiple parts (e.g., multiple sections or pages). The large scale of an archive may make it challenging for a user locate a desired item within the archive. And once found, the user may have difficulty navigating to a desired part of the item.

SUMMARY

According to one illustrative implementation, this disclosure sets forth an approach for navigating within a collection of items using an item user interface (UI) presentation having an information-enhanced scrolling region. (In this context, the term "item" encompasses discrete file-type items as well as component-type items that form parts of a more complex item.) More specifically, the item UI presentation includes an item presentation region that displays a representation of the collection of items. The item UI presentation also includes a scrolling region that enables a user to navigate through the collection of items. The scrolling region is enhanced by displaying scrolling-region information pertaining to the collection of items.

For example, the collection of items may correspond to items stored in a nested hierarchy of containers (e.g., defining a directory structure of folders). In this case, the scrolling region can present scrolling-region information regarding a flattened (e.g., expanded) list of containers. A user may use the scrolling-region information to facilitate the user's navigation through the collection of items.

According to another illustrative aspect, the scrolling region may include a slider member. The slider member is a control element that the user may engage to navigate through the collection of items. The slider member can, through a transparency effect, reveal the contents of scrolling-region information which is "beneath" the slider member. In one case, the scrolling region can change the content of the scrolling-region information beneath the slider member as the user moves the slider member.

According to another illustrative aspect, the scrolling region may present background information which is varied based on at least one attribute associated with the collection of items.

According to another illustrative aspect, one or more emphasis-related attributes may be associated with each of the collection of items. The item presentation region may vary the representation of the collection of items based on the emphasis-related attributes. For example, the item presentation region may change the size of the item representations and/or the highlighting applied to the item representations based on the emphasis-related attributes. In addition, or alternatively, the item presentation region may organize two or more item representations in a cluster of reduced-size representations.

The above approach can be manifested in various types of systems, components, user interface presentations, methods, computer readable media, data structures, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure sets forth an approach for presenting an information-enhanced item user interface (UI) presentation with scrolling-region information. In one example, a scrolling region of the item UI presentation can be enhanced by presenting information regarding a flattened list of containers. In another example, an item presentation region of the item UI presentation can be enhanced by varying a representation of a collection of items based on at least one emphasis-related attribute associated with the collection of items. The various features of the item UI presentation may facilitate the user's navigation through a large collection of items.

This disclosure is organized as follows. Section A describes an illustrative item processing system that presents an information-enhanced item UI presentation. Section B describes illustrative methods which explain the operation of the item processing system. Section C describes illustrative processing functionality that can be used to implement any aspect of the features described in Sections A and B.

Figure 11:
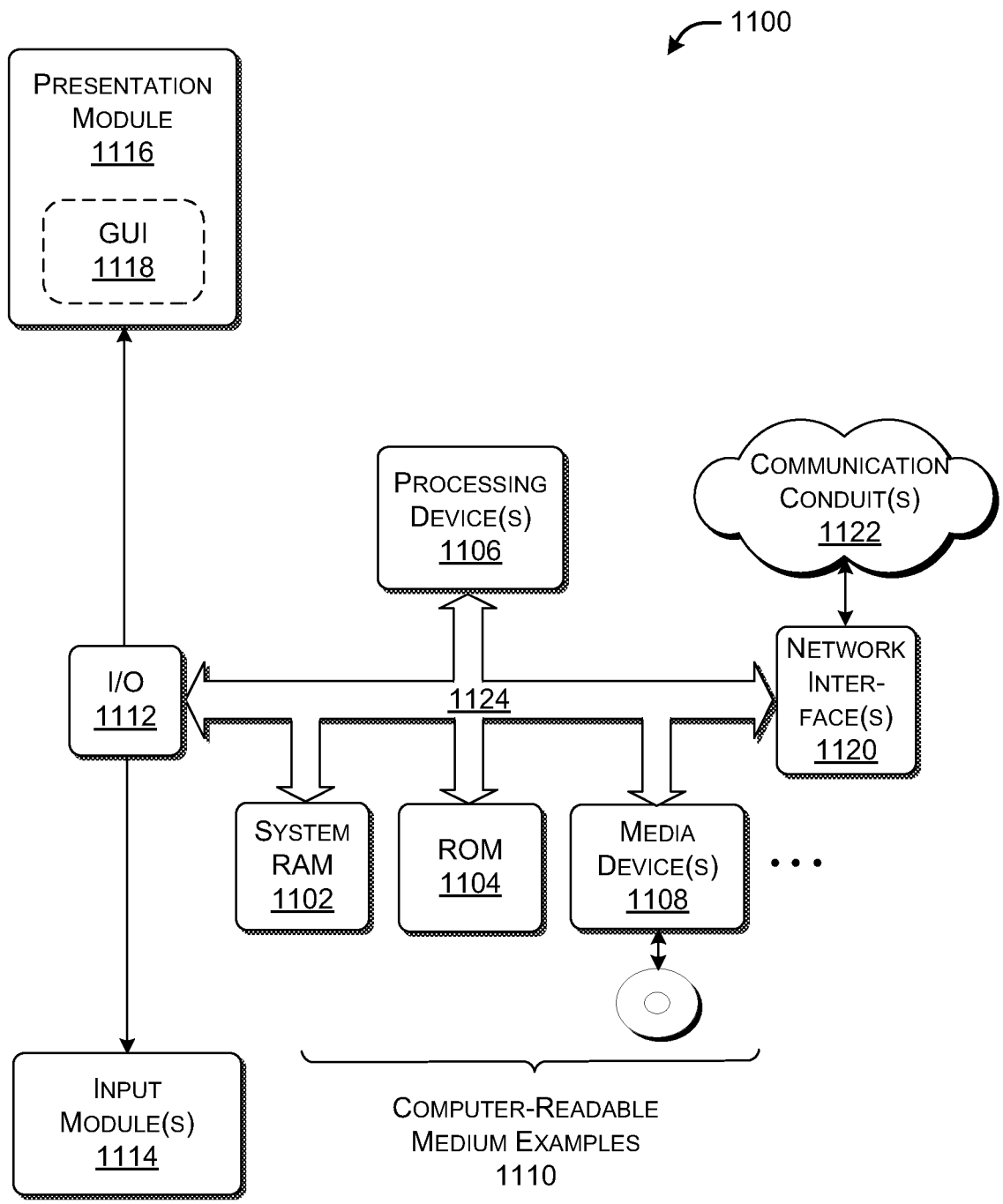
FIG. 11 shows illustrative processing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner, for example, by software, hardware (e.g., discrete logic components, etc.), firmware, and so on, or any combination of these implementations. In one case, the illustrated separation of various components in the figures into distinct units may reflect the use of corresponding distinct components in an actual implementation. Alternatively, or in addition, any single component illustrated in the figures may be implemented by plural actual components. Alternatively, or in addition, the depiction of any two or more separate components in the figures may reflect different functions performed by a single actual component. FIG. 11, to be discussed in turn, provides additional details regarding one illustrative implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented by software, hardware (e.g., discrete logic components, etc.), firmware, manual processing, etc., or any combination of these implementations.

As to terminology, the phrase "configured to" or the like encompasses any way that any kind of functionality can be constructed to perform an identified operation. The functionality can be configured to perform an operation using, for instance, software, hardware (e.g., discrete logic components, etc.), firmware etc., and/or any combination thereof.

The term "logic" encompasses any functionality for performing a task. For instance, each operation illustrated in the flowcharts corresponds to logic for performing that operation. An operation can be performed using, for instance, software, hardware (e.g., discrete logic components, etc.), firmware, etc., and/or any combination thereof.

A. Illustrative Systems

A.1. System Overview

Figure 1:
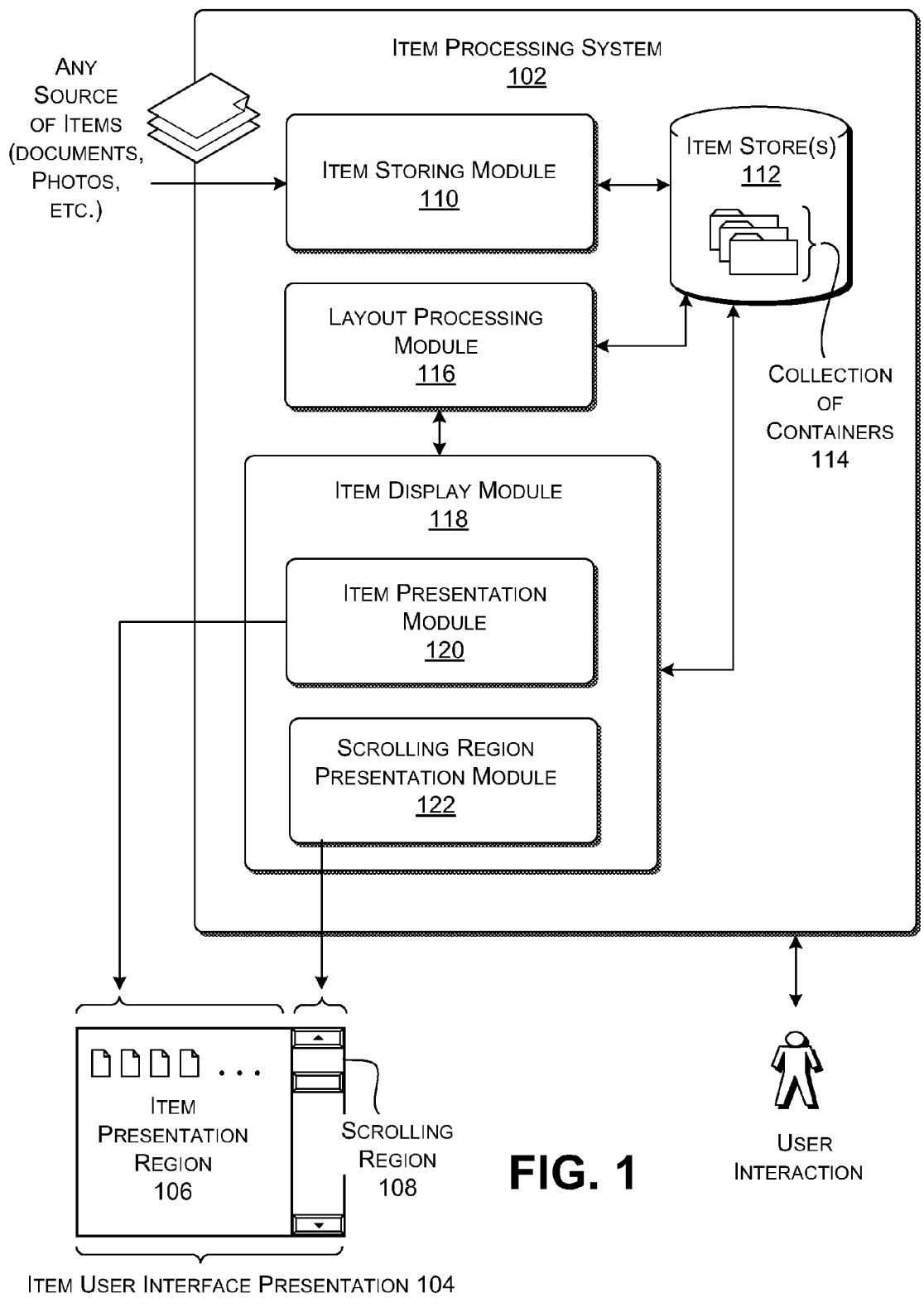
FIG. 1 shows an illustrative electronic item processing system for displaying an information-enhanced item user interface (UI) presentation.

FIG. 1 shows an electronic item processing system 102 ("item processing system" for brevity) for presenting an item user interface (UI) presentation 104. The item UI presentation 104 includes an item presentation region 106 for displaying a representation of a collection of items. The item UI presentation 104 also includes a scrolling region 108 for navigating within the collection of items. In a manner to be illustrated in later figures, the scrolling region 108 can include region-scrolling information that pertains to the collection of items. In this sense, the scrolling region 108 can be characterized as an information-enhanced scrolling region.

The item processing system 102 includes, or can be conceptualized to includes, a number of components for producing the item UI presentation 104. For instance, an item storing module 110 accepts a collection of items. The term "item" should be broadly construed as used herein. In one case, an item corresponds to a file-type item, meaning a discrete unit that can be given a file name and stored. This type of item can correspond to a document of any type, a digital photograph, a code file, and so on. In another case, an item can correspond to a component-type item, meaning an item that is part of another, more complex, item. For example, this type of item can correspond to a section or page or other component of a multi-part document. No limitation is placed on what may constitute an item. Many of the following examples are set forth in the context of discrete file-type items, but the principles imparted herein apply equally to component-type items.

The item storing module 110 may receive the items from any source or combination of sources. In one case, the item storing module 110 may receive the items from a source which has created the items. For example, the item storing module 110 may receive the items from an application module which creates documents or a camera that creates digital photographs. In another case, the item storing module 110 may receive items from one or more other repositories of items. For example, the item storing module 110 may receive the items from a network store or a local store of such items.

The item storing module 110 may optionally store the items in an item store 112. Further, in one example, the item storing module 110 may organize the items in a collection of containers 114. In one case, the collection of containers 114 may correspond to different folders in a directory structure. In one case, the containers may form a nested structure. For example, the contents of a parent folder may include one or more child folders, the contents of a child folder may include its own one or more child folders, and so on. Each folder may include any number of items (including zero items). The item storing module 110 can store items using other types of data structures. For example, the item storing module 110 can store component-type items as nested parts within an XML-structured master document.

A layout processing module 116 performs any processing on the items in preparation for the display of the item UI presentation 104. Later figures and accompanying discussion will set forth examples of the type of processing that can be performed by the layout processing module 116. By way of overview, each item may be associated with one or more attributes. In one case, the layout processing module 116 can process attributes associated with the collection of items.

More specifically, an attribute corresponds to any information that pertains to an item in any way. In one case, an attribute may correspond to supplemental information which accompanies the item. For example, an attribute may correspond to metadata which conveys descriptive information about a file-type item. In another case, an attribute may correspond to any feature within the content of the item itself. For example, an attribute may correspond to any information that appears within the content of an item, such as a term that appears within the text of a document-type item.

The layout processing module 116 can play a role in identifying attributes associated with the items, as governed by any set of rules or other controlling mechanism. In one example, the layout processing module 116 can extract time information which accompanies digital photographs. In another example, the layout processing module 116 can extract tags or other type of metadata that have been associated with the items. In another example, the layout processing module 116 can extract keywords or other information within the content of the items themselves. In any of these cases, the layout processing module 116 may allow a user to manually interact with the items to modify attributes associated with the items, create new attributes, and so on. No limitation is placed on how the attributes may be associated with the items or how the attributes may be identified and extracted.

An item display module 118 displays the items in the item UI presentation 104, as governed by the layout processing module 116. The item display module 118 also governs the behavior of the item UI presentation 104 as the user interacts with the item UI presentation 104. The item display module 118 can include, or can be conceptualized to include, an item presentation module 120 and a scrolling region presentation module 122. The item presentation module 120 displays the item presentation region 106 of the item UI presentation 104. The item presentation region 106 shows a representation of the items. The scrolling region presentation module 122 displays the scrolling region 108 of the item UI presentation 104. The scrolling region 108 allows a user to navigate within the collection of items to select a desired item. The scrolling region 108 is enhanced to include scrolling-region information.

Figure 2:
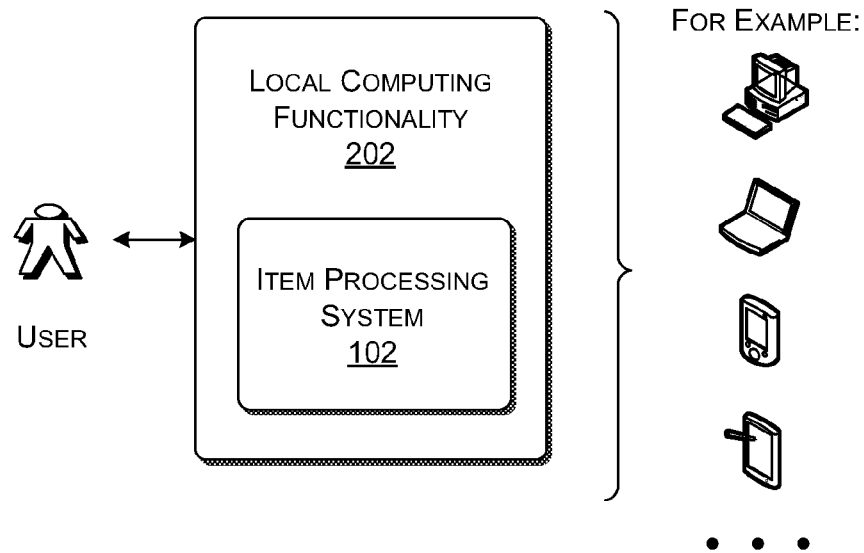
FIG. 2 shows one illustrative implementation of the item processing system of FIG. 1.
Figure 3:
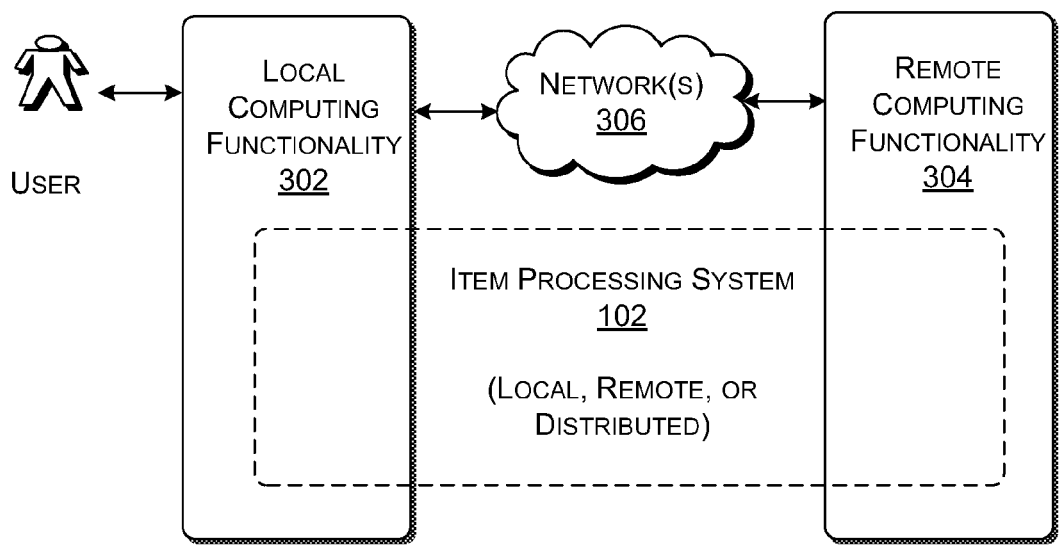
FIG. 3 shows another illustrative implementation of the item processing system of FIG. 1.

FIGS. 2 and 3 show two representative implementations of the item processing system 102 of FIG. 1. These two implementations are not exhaustive; other implementations are possible.

More specifically, FIG. 2 shows a stand-alone implementation of the item processing system 102 of FIG. 1. In this case, a user interacts with local computing functionality 202, and this local computing functionality 202 provides all the features of the item processing system 102. The local computing functionality 202 can correspond to any type of functionality for performing the above-described functions, such as a personal desktop computing device, a laptop computing device, a personal digital assistant (PDA) type computing device, a stylus-type computing device, a mobile phone type computing device, and so on. In these applications, one or more processors can implement the above-described functions when executing computer readable instructions. Alternatively, or in addition, the local computing functionality 202 can represent a custom device which includes components that are particularly tailored to perform the above-described functions.

FIG. 3 shows another implementation of the item processing system 102. Here, a user uses local computing functionality 302 to interact with remote computing functionality 304 via a network 306. The dashed box indicates that the features of the item processing system 102 can be distributed between the local computing functionality 302 and the remote computing functionality 304 in any manner. For example, in one case, the remote computing functionality 304 can implement all the features of the item processing system 102 (e.g., as in the case of a web-type application). In another case, the local computing functionality 302 and the remote computing functionality 304 can together cooperatively implement the features of the item processing system 102 in distributed fashion. The local computing functionality 302 may represent any of the types of devices described above in connection with FIG. 2. The remote computing functionality can represent any type of remote processing infrastructure, such as one or more server-type computing devices in cooperation with one or more data stores (and potentially other types of data processing equipment). The network 306 can represent a local area network, a wide area network (e.g., the Internet), or some combination thereof.

A.2. Overview of Item User Interface Presentation

Figure 4:
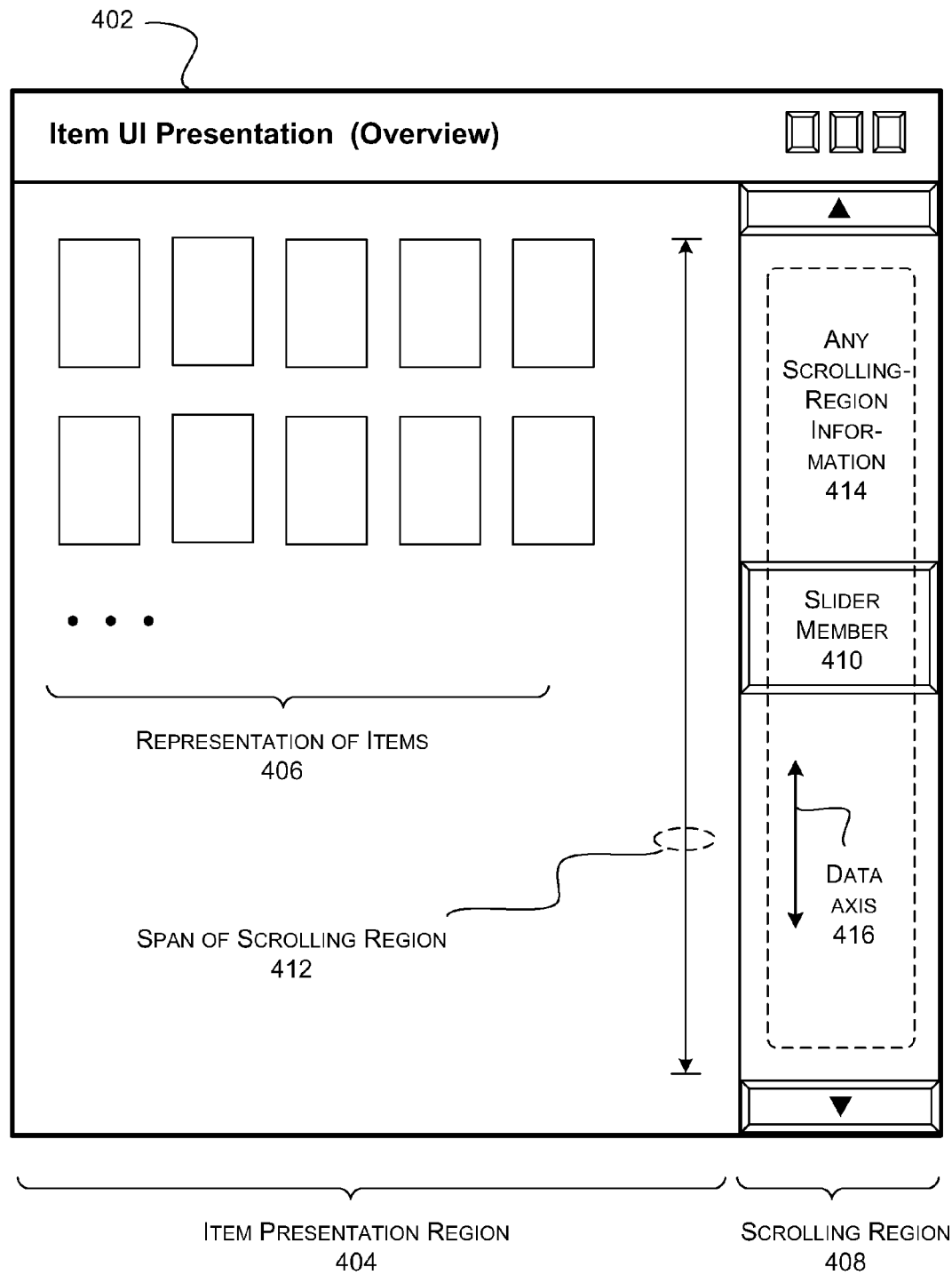
FIG. 4 shows an overview of an illustrative item UI presentation that can be produced by the system of FIG. 1.

FIG. 4 shows an item user interface (UI) presentation 402 that represents one illustrative implementation of the item UI presentation 104 of FIG. 1. The selection and arrangement of the functionality shown in FIG. 4 is intended to be representative and non-limiting, as is the "look and feel" of the functionality shown in FIG. 4.

The item UI presentation 402 includes an item presentation region 404 for presenting a representation 406 of a collection of items. Here, the item presentation region 404 takes the form of a single rectangular panel, but other item UI presentations can adopt panels having different shapes, panels having multiple component parts, and so on. The item presentation region 404 can depict the items in any way. In this example, the item presentation region 404 uses icons to represent the items. Alternatively, or in addition, the item presentation region 404 can use file names or other information to represent the items. Moreover, for the case in which the items represent parts of a single encompassing item, the item presentation region 404 can present the items by displaying the encompassing item itself. For example, the item presentation region 404 can display a document that includes multiple component parts.

The item UI presentation 402 also includes a scrolling region 408. The scrolling region 408 provides functionality that enables a user to navigate within a collection of items by moving a slider member 410 along a possible span 412 of movement. In the example of FIG. 4, the scrolling region 408 may extend along a vertical dimension of the item UI presentation 402. In other cases, the scrolling region 408 may extend along a horizontal dimension (or any other dimension or path) of the item UI presentation 402. In other cases, the item UI presentation 402 can include plural scrolling regions extending along any combination of paths within the item UI presentation 402.

In one implementation, the item presentation module 120 presents a sub-collection of items (culled from an entire collection of items that can be displayed) within the item presentation region 404 based on a position of the slider member 410 within the scrolling region 408. The user may view another sub-collection of items by moving the slider member 410 to a new location within the scrolling region 408. In one example, the slider member 410 has a dimension (such as its height) that relates to the fraction of the complete collection of items that are presented in the item presentation region 404. Thus, for particularly large collections, the slider member 410 may be relatively short, and for particularly small collections, the slider member 410 may be relatively tall. The user may engage the slider member 410 using any input device, such as a mouse-type input device, a key-type input device, a touch-sensitive screen input device, and so on.

The scrolling region presentation module 122 displays scrolling-region information 414 within a panel defined by the scrolling region 408. In another case, the scrolling-region information 414 may extend, partially or entirely, outside the perimeter of the scrolling region 408. Still other ways of presenting the scrolling-region information 414 are possible.

The scrolling-region information 414 itself may provide any type of descriptive content associated with the items displayed in the item presentation region 404. Later figures, to be discussed below in turn, illustrate representative examples of the type of scrolling-region information 414 that can be placed in the scrolling region 408. As a general aspect, the scrolling region presentation module 122 presents the scrolling-region information 414 along a data axis 416. Different parts of the scrolling-region information 414 along the data axis 416 correspond to different parts of the collection of documents. More specifically, the part of the scrolling-region information 414 that is associated with a position of the slider member 410 relates to the sub-collection of documents presented in the item presentation region 404.

In one case, the user may manually select the manner in which items are to be organized, and hence, the type of content conveyed by the scrolling-region information 414. For example, the user may expressly dictate that the items are to be organized by date. The layout processing module 116 may respond by extracting date information from the items, and the item display module 118 may present chronological information along the data axis 416 of the scrolling region 408.

Alternatively, or in addition, the layout processing module 116 can perform processing on a collection of items to automatically deduce relevant content to present in the scrolling-region information 414. This mode of operation of the layout processing module 116 can be governed by any rules framework or other guiding mechanism. For example, the layout processing module 116 may observe that a significant number of items include a particular type of attribute. For example, the layout processing module 116 may note that a significant number of items have been annotated with a particular type of tag, such as "Birthday" for digital photographs pertaining to pictures taken at a birthday parties, or "Vacation" for photographs taken while on vacation. In response, the layout processing module 116 can provide subject matter categories along the data axis 416 that correspond to Birthday and Vacation, among other categories. Alternatively, or in addition, the layout processing module 116 may direct the item display module 118 to display icons or other visual indicia in the scrolling region 408 in proximity to clusters of photographs that are predominantly associated with the tags Birthday or Vacation. In another case, the layout processing module 116 can extract features from within an item itself (such as from the text of a document) and use these features to determine the content to be conveyed by the scrolling-region information 414. The layout processing module 116 can be configured to generate the scrolling-region information 414 in yet additional ways.

In one case, the slider member 410 is displayed so as to have a transparent visual effect. By virtue of this feature, scrolling-region information 414 that lies "beneath" a window defined by a perimeter of the slider member 410 is visible "through" the slider member 410. In one case, as mentioned above, the height of the slider member 410 generally corresponds to a sub-collection of items shown in the item presentation region 404, culled from an entire displayable collection of items. In this case, the scrolling-region information 414 which appears "beneath" the slider member 410 generally corresponds to the sub-collection of the items that currently appears in the item presentation region 404. Parts of the scrolling-region information 414 that lie outside the window defined by the slider member 410 may correspond to items that are not currently visible in the item presentation region 404. The user may navigate to those other items by moving the slider member 410 to a corresponding location within the scrolling region 408 or by directly activating icons or other displayable bookmarks or the like (not shown) within the scrolling-region information 414.

As will be discussed, the scrolling-region information 414 can include a list of informative labels along the data axis 416, such as a list of folder names, dates, numbers, keywords, etc. In one implementation, a constant distance is used to separate neighboring labels in the scrolling-region information 414. In another case, a variable distance can be used to separate neighboring labels in the scrolling-region information 414. In the latter case, the distances can vary based on the number of items associated with the labels. This feature may be appropriate in the scenario in which labels correspond to groups of items of varying sizes. Alternatively, or in addition, the behavior of the scrolling region 408 can change as the use advances along the data axis 416 based on any consideration or combination of considerations.

By virtue of the use of the information-enhanced item UI presentation 402, the user can gain a quick grasp of the contents of the collection of items by viewing the scrolling-region information 414. This is because the scrolling-region information 414 provides a summary of the contents within a collection of items. Further, the user can efficiently navigate to a desired location within the collection of items by using the scrolling-region information 414. This is because the scrolling-region information 414 is integrated into the mechanism (the scrolling region 408) by which the user moves throughout the collection of items, providing clear guidance to the user regarding how to access desired items.

A.3. Presentation of a Flattened List in the Scrolling Region

Figure 5:
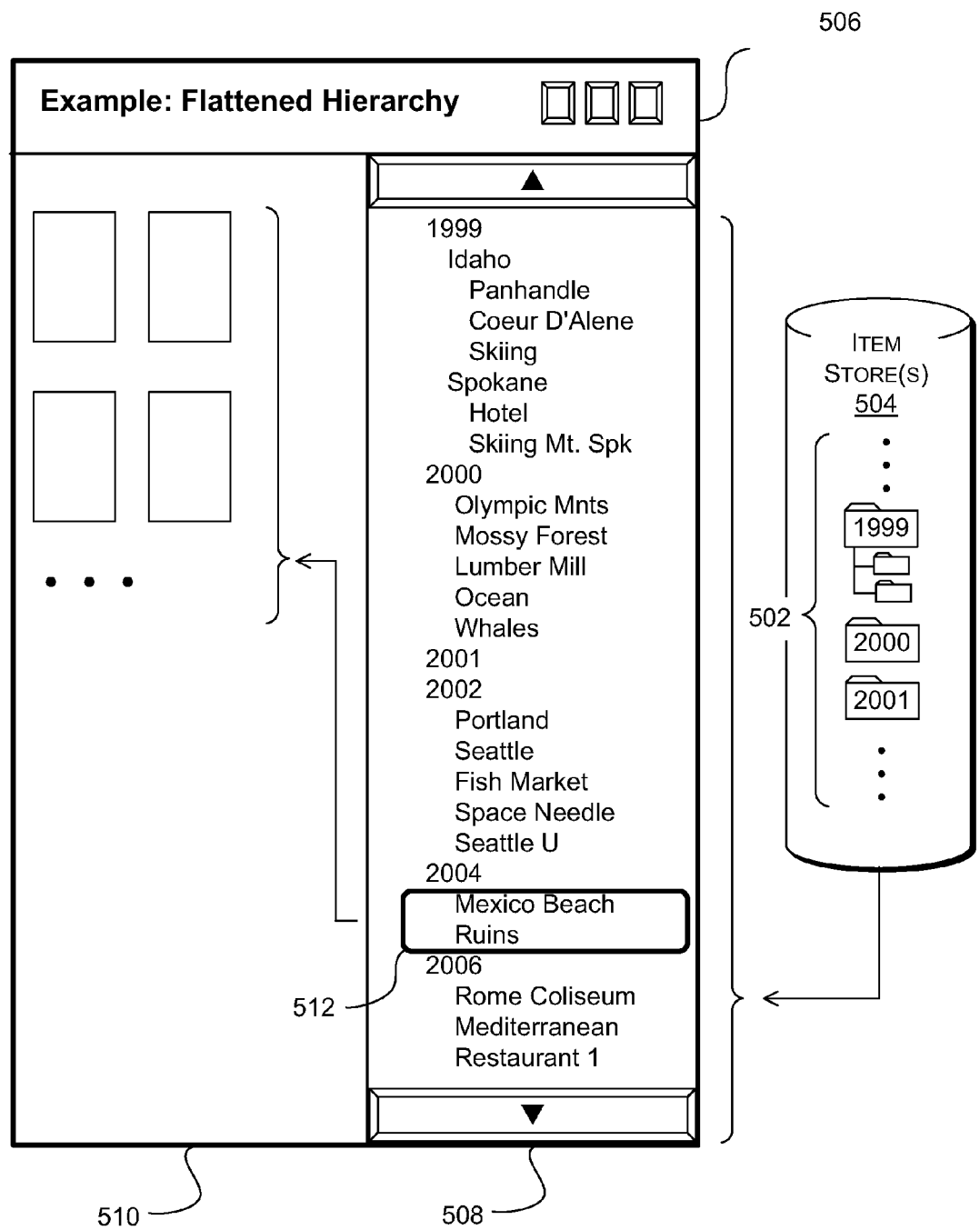
FIG. 5 shows an item UI presentation with a scrolling region that displays information regarding a flattened list of folders.

FIG. 5 shows a first example of the type of item UI presentation described in the preceding sections. Here, assume that the user has stored a collection of items in one or more containers 502, such as file folders in a directory structure. The containers 502 may be physically archived in a store 504, such a local client store, a remote network store, etc. In one illustrative scenario, a master container may encompass all other containers 502 in the collection. For example, the master container may encompass folders dedicated to individual years, e.g., 1999, 2000, etc. Each of the folders, may, in turn, include additional folders. For example, the folder dedicated to the year 1999 may include a folder entitled "Idaho" and a folder entitled "Spokane." The folder entitled "Idaho," in turn, may include component folders entitled, "Panhandle," "Coeur D'Alene," and "Skiing." Finally, any folder in the directory structure may include one or more digital photographs (or other items).

A user may generate a request to view the individual items within the master encompassing container, e.g., by clicking on the master encompassing folder or performing some other type of initiating action. In response, the layout processing module 116 of FIG. 1 expands the folders in the directory structure into a flattened list, that is, by enumerating all the folders encompassed by the master folder into a linear list of folders. The item display module 118 then displays an item UI presentation 506 that includes information regarding the flattened list as scrolling-region information within a scrolling region 508.

That is, the scrolling region 508 enumerates the folders in the directory structure associated with containers 502. FIG. 5 shows that neighboring folder names in the scrolling region 508 are separated by the same distance, but these folder names can also be separated by varying distances (e.g., based on the number of items in the corresponding folders). An item presentation region 510 displays representations of a collection of items, where the collection of items is selected based on a position of a slider member 512. Here, for example, by virtue of a transparent display effect, the slider member 512 demarcates two folders, "Mexico Beach," and "Ruins," which are subsumed by the parent folder "2004." The item presentation region 510 may display representations of at least a subset of the digital photographs within these folders. The item presentation region 510 may also display digital photographs within folders which precede and/or follow the designated folders ("Mexico Beach" and "Ruins"). For example, if the folders "Mexico Beach" and "Ruins" only contain a few digital photographs each, then the item presentation region 510 may also display digital photographs from neighboring folders.

By virtue of the presentation of the flattened list within the scrolling region 508, the user may be apprised of the overarching container structure used to organize the items. This facilitates the user's navigation through the structure, enabling the user to efficiently locate items of interest.

In one example, a span of the scrolling region 508 may display all the folders identified by the scrolling-region information. That is, the first folder may correspond to "1999" and the last folder may correspond to "Restaurant 1." In another case, a span of the scrolling region 508 displays only a portion of the entire scrolling-region information. That is, there may be one or more folders preceding the folder "1999" that are not shown in the scrolling region 508, and there may likewise be one or more folders following the folder "Restaurant 1" that are not shown in the scrolling region 508. This manner of presentation may be deemed appropriate in case that the list of folders within the directory structure is relatively long, making it challenging to meaningfully display the entire list within the span of the scrolling region 508.

In the latter scenario described above, the item display module 118 may implement navigation behavior such that movement of the slider member 512 causes a corresponding movement of information within the scrolling region 508. For example, movement of the slider member 512 may cause a counterbalancing movement of the scrolling-region information in an opposite direction. For example, assume that the user desires to advance the slider member 512 such that it overlays the folder "Restaurant 1." In this case, the user's movement of the slider member 512 in a downward direction may prompt the item display module 118 to move the list of folders upward. In this manner, when the user reaches the folder "Restaurant 1," that folder may no longer be the last item in the list. That is, the list may have changed to reveal additional folders which follow the folder "Restaurant 1." Different rules can be used to implement this behavior. In one merely illustrative case, the item display module 118 can be configured to display at least some number n of items on the top of the slider member 512 and some number n of items on the bottom of the slider member 512 (except when the user truly reaches the endpoints of the list, upon which the user may advance the slider member 512 to within n number of items from an end of the list).

Figure 6:
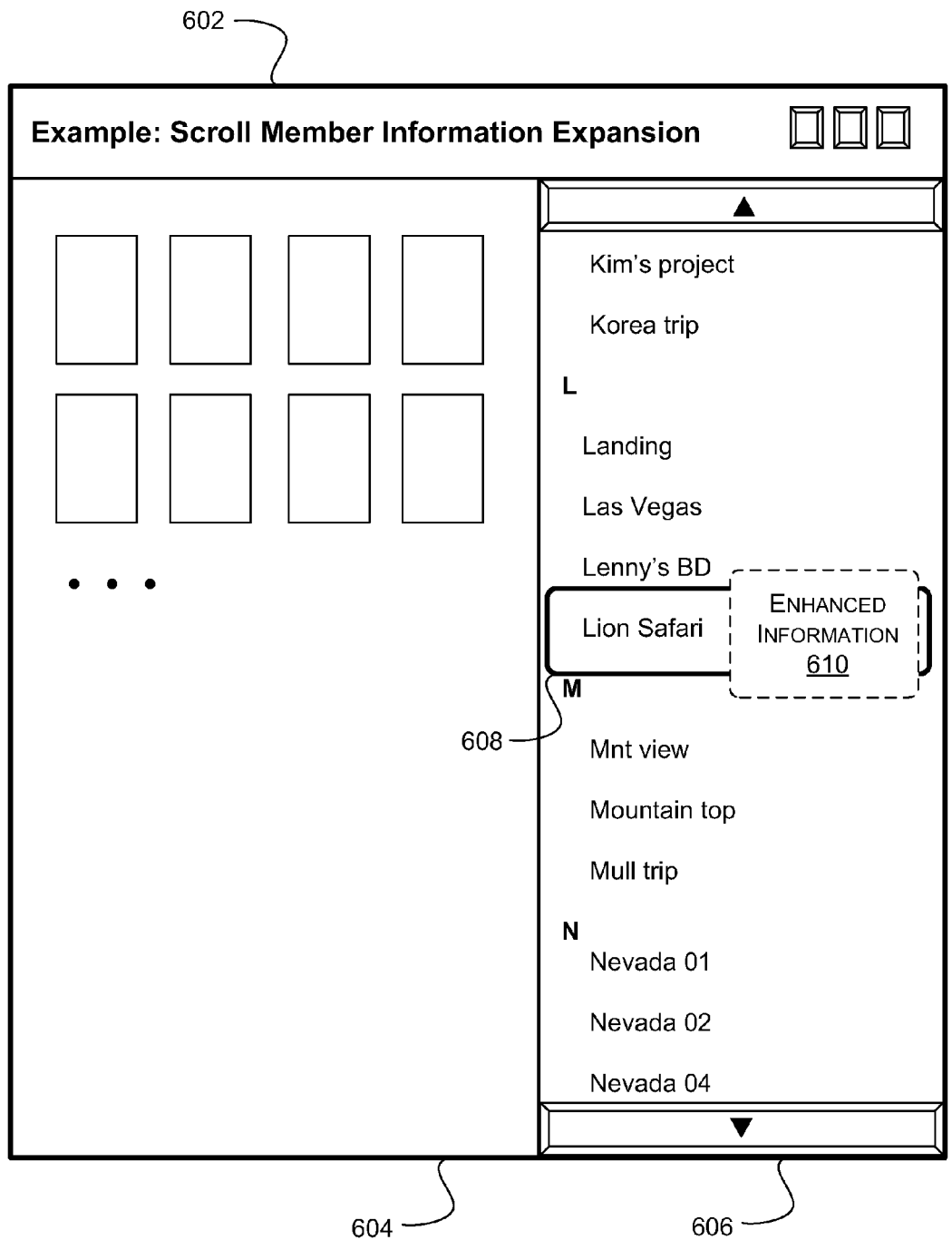
FIG. 6 shows an item UI presentation with a scrolling region that varies the content of scrolling-region information as a function of a position of a slider member within the scrolling region.

A.4. Presentation of Enhanced Information as a Function of Slider Member Position FIG. 6 shows another item UI presentation 602 that includes an item presentation region 604 and a scrolling region 606. As before, the scrolling region 606 may present a flattened list of folders, e.g., by enumerating child folders nested within parent folders, etc. In this case, however, the scrolling region 606 re-organizes the collection of folders along an alphabetical data axis. That is, scrolling region 606 arranges the folders in alphabetical order along the alphabetical data axis. Again, the scrolling region 606 may present only a portion of the entire contents of the scrolling-region information. In the present scenario, the user has positioned a slider member 608 such that it overlays a folder entitled "Lion Safari." The item presentation region 604 presents items that correspond to that position of the slider member 608. For example, the items may correspond to at least a subset of items within the particular folder "Lion Safari," as well as, potentially, items from other neighboring folders. (Further note that, while the height of the slider member 608 in this example is such that it is able to demarcate an individual folder, the height of the slider member 608 is generally based on the nature of the set of items being examined; in other cases, the height can span more than one folder, or perhaps only part of a folder.)

In the example of FIG. 6, the item display module 118 can be configured such that it dynamically varies the information that is presented in the scrolling region 606 based on the position of the slider member 608. For example, the item display module 118 can change the information it presents for a particular folder (or folders) when the slider member 608 is positioned over that particular folder. For instance, when the user positions the slider member 608 over the folder "Lion safari," the item display module 118 can display additional information that was not previously displayed in the scrolling region 606. Alternatively, or in addition, the item display module 118 can emphasize information that is already present in the scrolling region 606 when the user moves the slider member 608 over it. For example, the item display module 118 can increase the size of the information, bold the information, change the color of the information, de-blur the information, and so on. In these scenarios, the slider member 608 may function using a metaphor of a magnifying glass, accentuating the contents of whatever lies beneath. The information that is presented is generically referred to as enhanced information 610, with the understanding that this information encompasses both new information and accentuated information.

One benefit of the above-described behavior is that the scrolling region 606 can provide rich information regarding the folders in the directory structure without overwhelming the user with too much information regarding folders that are not currently being examined. In other words, this provision helps reduce the amount of clutter within the scrolling region 606. But the scrolling region 606 can still display some information regarding the directory structure as a whole (such as the names of the folders) to assist the user in navigating over the entire span of the directory structure.

The enhanced information 610 can encompass any type of information that may help the user navigate through the directory structure. In one case, the enhanced information 610 may present overview information regarding the items that correspond to the position of the slider member 608. For example, the enhanced information 610 may present information regarding metadata associated with the items, etc., revealing, for instance, that a prevalent tag associated with items in the designed folder "Lion safari" is the word "Africa." In addition, or alternatively, the enhanced information 610 may provide an indication of the number of the items demarcated by (or otherwise associated with the position of) the slider member 608, the sizes of the items, etc. No limitation is placed on what information may constitute the enhanced information 610.

In one example, the scrolling region 606 may present the enhanced information 610 within a window defined by the slider member 608. In another case, the scrolling region 606 may present the enhanced information 610 such that at least part of it extends beyond the scrolling region 606. In another case, the scrolling region 606 may present the enhanced information 610 entirely outside the scrolling region 606. In any of these cases, the scrolling region 606 can represent the enhanced information 610 using any display metaphor. In one case, the scrolling region 606 may display the enhanced information 610 in the same manner that it presents other information within the scrolling region 606. In another case, the scrolling region 606 may display the enhanced information 610 by highlighting it in any manner described above, e.g., so as to accentuate the enhanced information 610 vis-à-vis the other information within the scrolling region 606. In another case, the scrolling region 606 may display the enhanced information 610 in a pop-up-type of panel or the like. Still other display strategies can be used.

The examples developed above pertain to the illustrative case in which the scrolling region displays folders in a directory structure. Further, the folders are arranged in alphabetical order. But the principles described above (pertaining to enhanced information 610) apply to any type of scrolling region regardless of the type of information that is displayed therein and the organization of that information.

A.5. Modulation of Background Information in Scrolling Region

Figure 7:
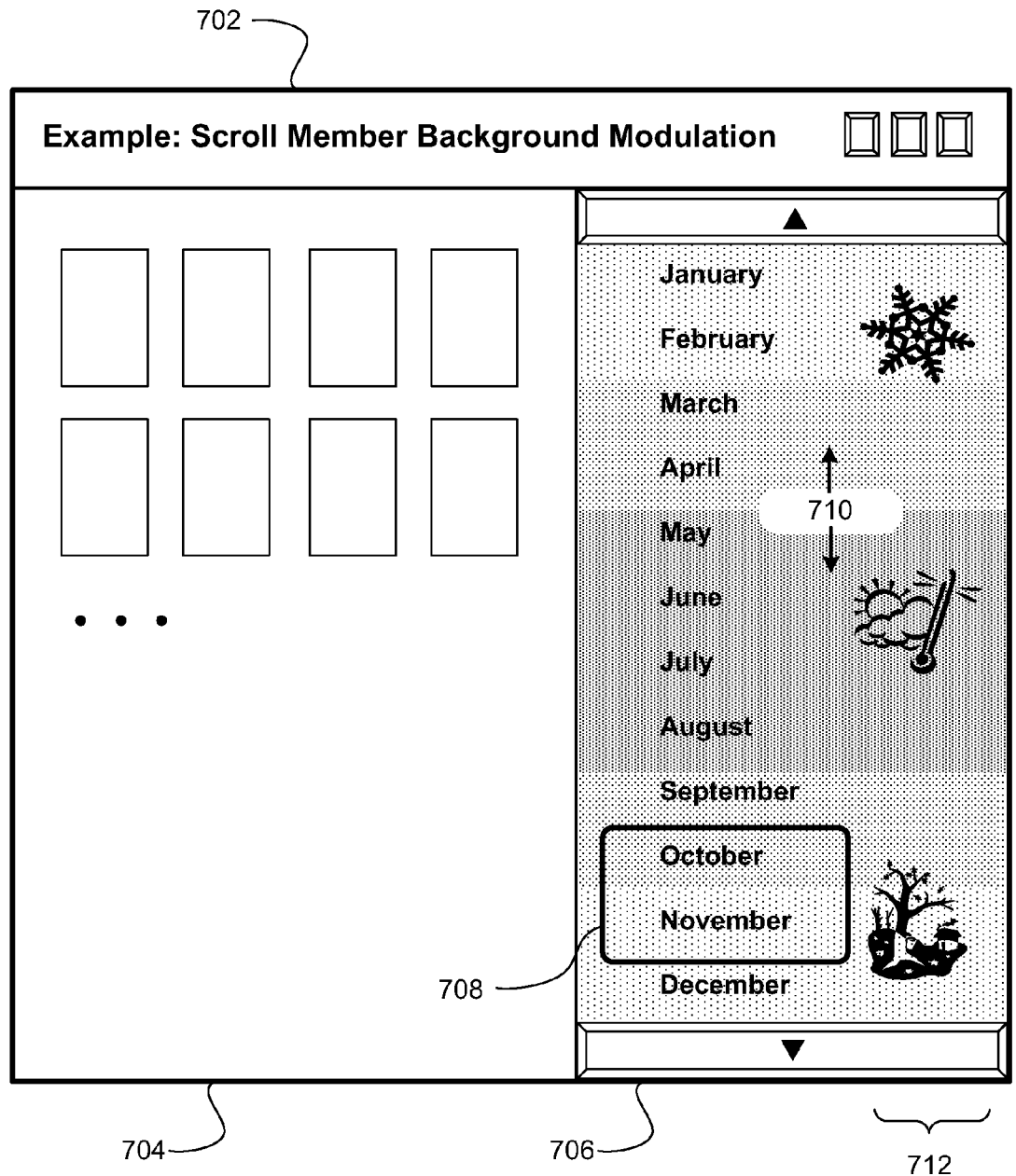
FIG. 7 shows an item UI presentation with a scrolling region that varies background information within the scrolling region as a function at least one attribute associated with a collection of items.

FIG. 7 shows another item UI presentation 702 that includes an item presentation region 704 and a scrolling region 706. Here, the scrolling region 706 may organize items along a chronological data axis. That is, the scrolling region 706 may present a list of months in the year, from January to December. The category of January may encompass all items created in the month of January, the category of February may encompass all items created in the month of February, and on. For example, the month of January may encompass all digital photographs taken by the user in the month of January. When a user positions a slider member 708 over a particular month (or months), the item presentation region 704 displays representations of at least a subset of the items associated with these months. In this particular example, the scrolling region 706 presents an entire span of scrolling-region information within the scrolling region 706. That is, the first category of the scrolling-region information corresponds to January and the last category corresponds to December.

In this example, the scrolling region 706 also includes background information 710. The background information 710 metaphorically underlies other content of the scrolling-region information, such as the names of the months, or a collection of tags 712 associated with the items, and so on. Here, the visual appearance of the background information 710 is varied on the basis of at least one attribute associated with the items. For example, assume that one attribute associated with the items corresponds to the month in which each of the items was created. In this case, the visual appearance of the background information 710 may change to reflect corresponding changes in the month. For example, the item display module 118 can use a first background appearance (color, density, glow effect, etc.) for the coldest months of the year, a second visual appearance for the warmest months of the year, and a third visual appearance for intermediary-temperature months, and so on.

The above-described example is merely illustrative. In general, the item display module 118 can vary the background information 710 in any way based on any underlying attribute or attributes associated with an underlying data set. In another example, the item display module 118 can change the background information 710 to reflect the density of items within a particular month. In another example, the item display module 118 can change the background information 710 to reflect the density of tags or comments associated with items, and so on. Further, the item display module 118 can vary the above-described background information 710 in the context of any type of scrolling-region information; that is, the example in which the scrolling-region information includes chronological information is merely representative.

The modulation of background information 710 facilitates the user's navigation through the scrolling-region information. This is because the modulation may quickly convey the organizational structure of items within the item presentation region 704.

Figure 8:
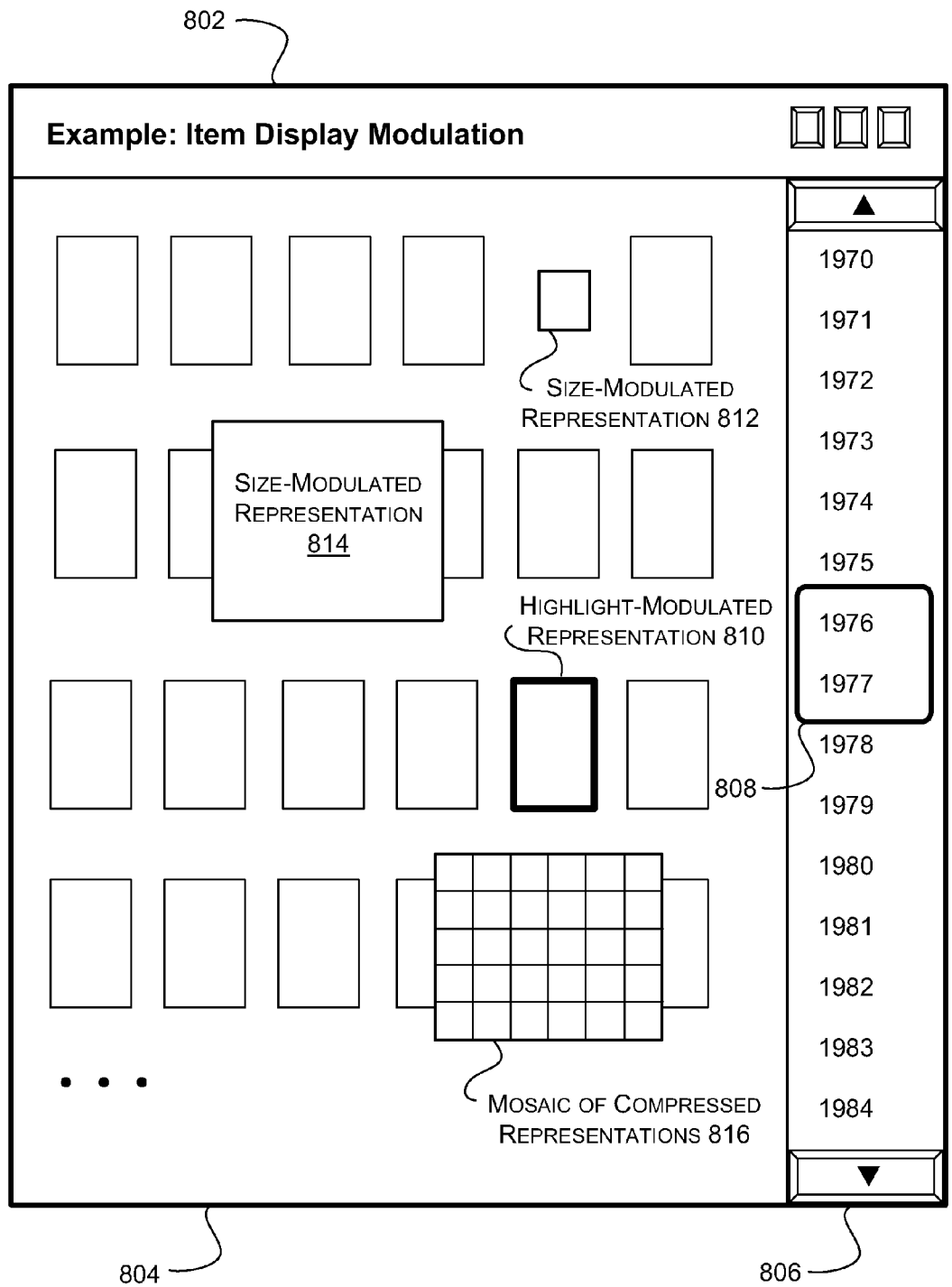
FIG. 8 shows an item UI presentation with a scrolling region that varies the representation of a collection of items based on at least one emphasis-related attribute associated with the collection of items.

A.6. Modulation of Item Representations Based on Emphasis-Related Attributes Associated with the Items FIG. 8 shows another item UI presentation 802 that includes an item presentation region 804 and a scrolling region 806. Here, the scrolling region 806 may organize items along a chronological data axis. That is, the scrolling region 806 may present a list of years. Each year may correspond to items created within that year (or otherwise associated with that year). When a user positions a slider member 808 over a particular year, the item presentation region 804 displays representations of at least a subset of the items associated with that year. In this particular example, the scrolling region 806 may present only a portion of an entire span of scrolling-region information within the scrolling region 806.

In this example, the item presentation module 120 assists the user in navigating through the items by modulating the information conveyed within the item presentation region 804, not the scrolling region 806. More specifically, each of the items may include at least one emphasis-related attribute associated therewith which can be mapped to a level of importance associated with the item. The item display module 118 may modulate (e.g., vary the appearance) of the representations of the items as a function of the importance associated with the items, as defined by the one or more emphasis-related attributes associated with the items.

FIG. 8 shows the modulation of the item presentation region 804 in the context of an item UI presentation 802 that includes a chronologically-enhanced scrolling region 806. But the item presentation module 120 can modulate the item presentation region 804 in conjunction with any type of information-enhanced scrolling region 806. In another case, the item presentation module 120 can vary the item presentation region 804 in the context of an item UI presentation that does not include any type of information-enhancement of the scrolling region 806. In other words, the features described in this subsection represent stand-alone features that can be employed independently of the scrolling-related features of preceding subsections.

Emphasis-related attributes can be associated with a collection of items in any manner. In one case, some user may, at some point, manually annotate an item with one or more emphasis-related attributes which conveys the importance of the item to the user (based on any consideration or combination of considerations). For example, the user may attach an emphasis-related attribute which takes the form of a star rating or the like. In another case, a collection of users may collaboratively define the emphasis-related attribute of an item. That is, such an emphasis-related attribute may reflect the consensus (e.g., average rating) of a group of users. In another case, any type of automated mechanism may automatically (or semi-automatically) assign an emphasis-related attribute to an item based on any rules framework or other guiding mechanism. Still other ways (and combinations of ways) of attaching emphasis-related attributes to items are possible.

The item presentation module 120 can vary the appearance of items in any way based on the emphasis-related attributes. In one example, the item presentation module 120 can highlight an item representation by changing any aspect of its visual appearance. For example, the item presentation module 120 can highlight an item representation 810 by bolding its border. This bolding may indicate that the item representation 810 is associated with an item that has a relatively high importance (as reflected by an emphasis-related attribute that is associated with this item. The item presentation module 120 can also highlight an item representation by altering its color, by adding a glow effect to it, by changing the degree to which it is faded out, and so on. No limitation is placed on the ways in which the item display module 118 can highlight an item representation.

In addition, or alternatively, the item presentation module 120 can also change the size of an item representation based on its associated emphasis-related attribute. For example, the item presentation module 120 can decrease the size of an item representation 812 to indicate that it is less important relative to other items in the item presentation region 804. The item presentation module 120 can increase the size of an item representation 814 to indicate that it is more important relative to other items in the item presentation region 804.

In addition, or alternatively, the layout processing module 116 can identify a collection of items having importance that is considered low based on any guiding criteria. For example, the layout processing module 116 can group together a collection of items that are annotated with an emphasis-related attribute that is below a prescribed threshold, e.g., having a level of two or less on a five-point rating system (in one merely illustrative example). The item presentation module 120 can then display the group of less significant items as a collection of reduced-size representations of these items. For example, the item presentation module 120 can display a mosaic 816 of reduced-size representations of a collection of items that have low importance. Optionally, the user may be permitted to click on the mosaic 816 (or perform some other triggering action) to expand the size of the items representations or to expand the size of a selected item representation in the mosaic 816.

In one case, the layout processing module 116 can group together low-importance items that lie within a prescribed range along the data axis of the scrolling region 806. For example, in the case of FIG. 8, the mosaic 816 may compile low-importance items that have been classified within the span of years 1976-1977 (which is the range demarcated by the slider member 608). In another case, the layout processing module 116 can group together low-importance items within the entire collection of items (without placing any proximity-based restraints on their grouping). Still other criteria may govern the manner in which the layout processing module 116 groups together items to from a compressed block of items.

In another case, the way in which the item presentation module 120 varies the appearance of item representations need not, in all cases, "linearly" map to the emphasis-related attributes associated with the items. For example, assume that the layout processing module 116 makes a determination that a sequence of twenty items has been marked as having low importance. In this case, the item presentation module 120 can display one or more members of this group using a normal-sized representation and the remainder of the items using reduced-size representations (which can be possibly organized into a composite block of such representations). In this manner, the user can be more effectively apprised of the contents of the reduced-size block, e.g., by examining the content of the normal-size member of the group.

Further, the emphasis-related attributes need not take the form of an express rating framework. For example, a user can set up a mapping engine that maps different attributes to different respective importance levels. For example, the user may identify that items annotated with the tag "My Kids" are more important than items annotated with the tag "Work." Based on such mapping, the item presentation module 120 can vary the representations in an appropriate manner.

In another variation, the layout processing module 116 can examine features of the metadata or content associated with items and make a determination that a group of items appears to pertain to a similar theme. For example, the layout processing module 116 can determine that a group of items is tagged with the label "Seattle Fish Market," from which it concludes that these items all pertain to the same theme. Or the layout processing module 116 can examine the text of text-related documents or the image content of image-related items to make a determination that a group of items pertains to a same theme. Based on these conclusions, the item presentation module 120 can vary the representations of some of the items to de-emphasize redundant content, or emphasize particularly interesting content, and so on. Accordingly, the terms "emphasis-related attribute" and "importance" have broad connotation as used herein. These terms are not restricted to the context of an express rating system. For example, an item can be assessed as important (or not important) if it is deemed worthy of emphasis (or de-emphasis) for any reason or combination of reasons.

In addition, or alternatively, the item presentation module 120 can be configured to allow a user to manually change the emphasis-related attribute of one or more item representations shown in the item presentation region 804. The user can enter such an instruction using any input device, such as a mouse-type device, key-type input device, etc. In response to this instruction, the item presentation module 120 can dynamically change the appearance of the targeted item representations, giving the user visual feedback regarding the outcome of his or her instruction. The user can use this approach to adjust previously-established emphasis-related attributes or to define initial emphasis-related attributes.

As explained above, the selective emphasis of items in the item presentation region 804 can be employed in combination with the use of the information-enhanced scrolling region 806 or in absence of such a scrolling feature. When used together, the information imparted by the item presentation region 804 and the scrolling region 806 complement each other, facilitating the user's navigation through a collection of item and making it easier for the user to locate a desired item of interest.

B. Illustrative Processes

Figure 9:
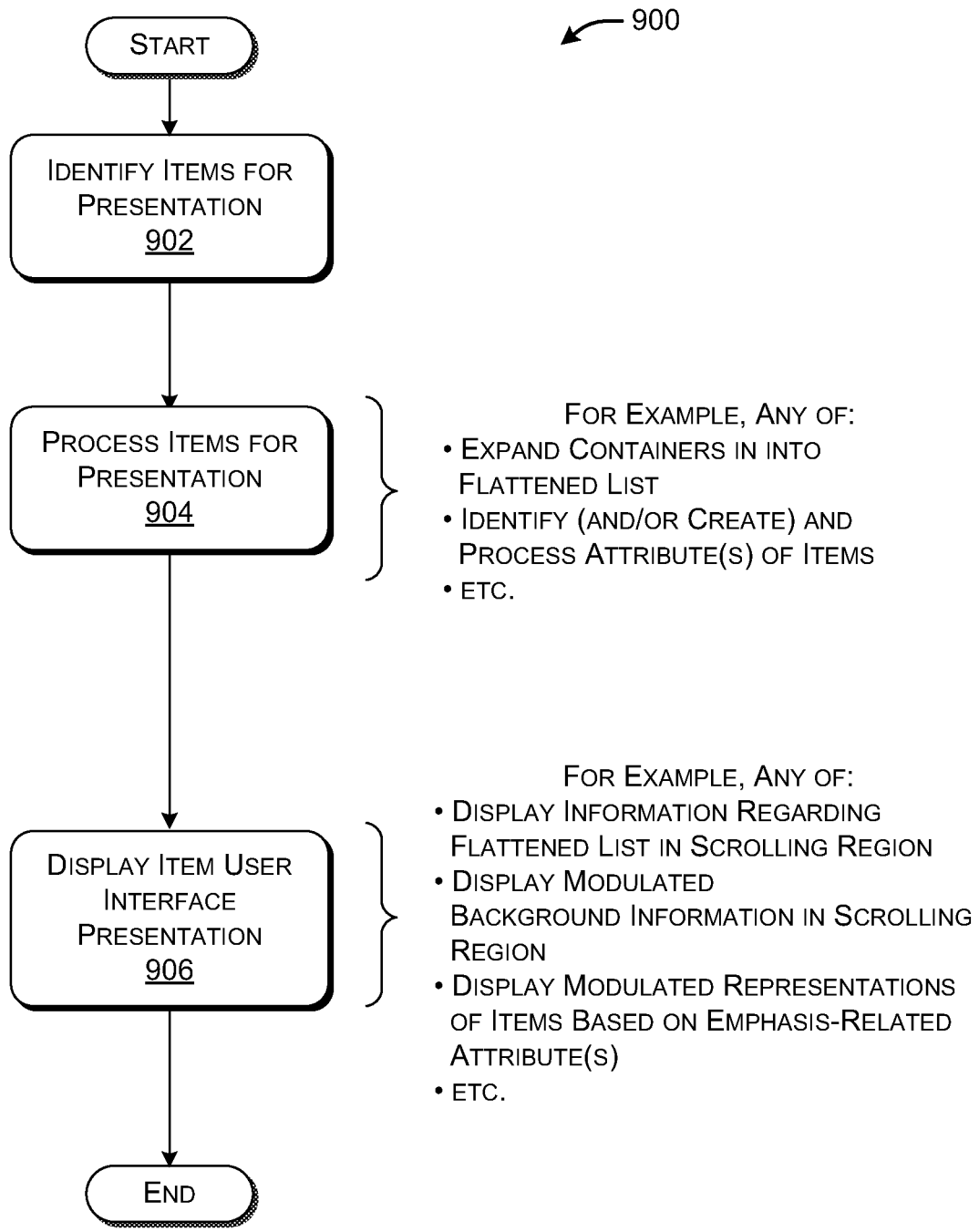
FIG. 9 shows an illustrative procedure for displaying an item UI presentation.
Figure 10:
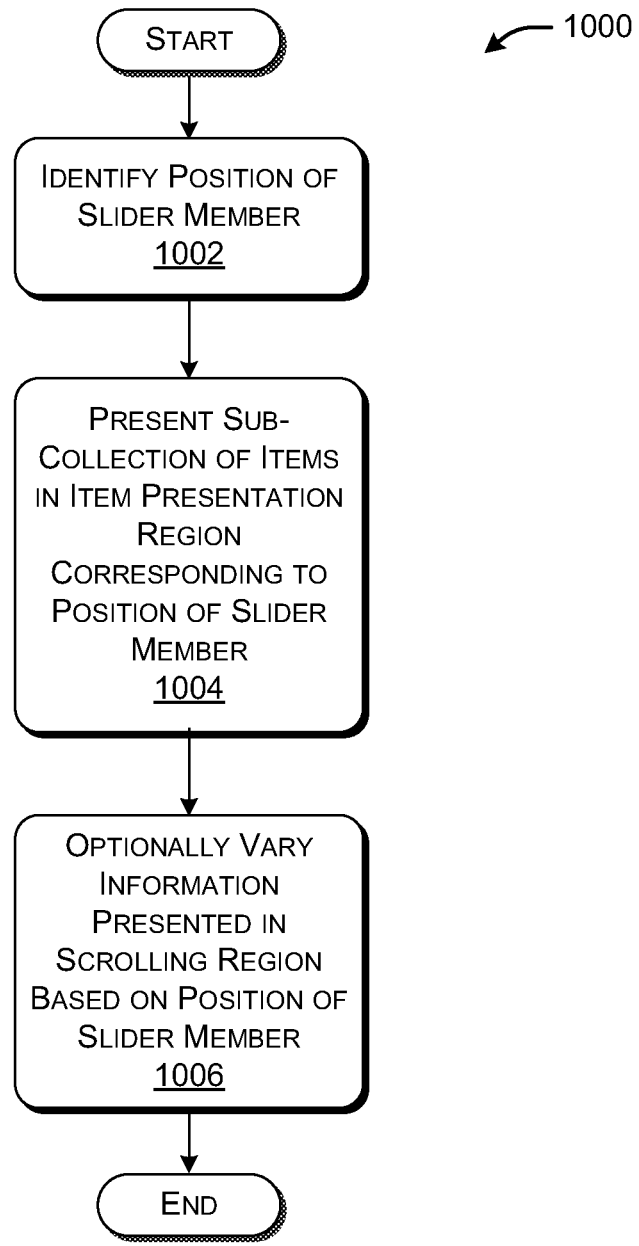
FIG. 10 shows an illustrative procedure for governing the behavior of an item UI presentation.

FIGS. 9 and 10 show procedures (900, 1000) that illustrate one manner of operation of the item processing system 102 of FIG. 1. Since the principles underlying the operation of the item processing system 102 have already been described in Section A, certain operations will be addressed in summary fashion in this section.

FIG. 9 shows a procedure 900 that explains a manner in which the item processing system 102 can generate the information-enhanced item UI presentation 104.

In block 902, the item processing system 102 identifies a collection of items for presentation in the item UI presentation 104. This may correspond to any operation. For example, the user may identify a master folder that contains a collection of items, possibly organized in one or more sub-folders. By clicking on this master folder or otherwise activating this master folder, the user thereby identifies the items which are to appear in the item UI presentation 104.

In block 904, the layout processing module 116 of the item processing system 102 processes the items for presentation. As described above, this operation may encompass a wide range of functions. In one case, the layout processing module 116 can expand a hierarchical structure of containers into a flattened list. In another case, the layout processing module 116 can extract and/or process any type of attributes associated with the items. Still other functions may be encompassed by block 904.

In block 906, the item display module 118 presents the item UI presentation 104. This operation may encompass a wide range of functions. For example, the item display module 118 can display information regarding a flatted list of containers in the scrolling region 108 of the item UI presentation 104. In another case, the item display module 118 can display modulated background information in the scrolling region 108. In another case, the item display module 118 can display modulated representations of items in item presentation region 106 of the item UI presentation 104 based on emphasis-related attributes associated with the items. Still other functions may be encompassed by block 906.

FIG. 10 shows a procedure 1000 that describes the behavior of the item UI presentation 104 as the user interacts with the item UI presentation 104.

In block 1002, the item display module 118 identifies a position of a slider member of the scrolling region 108.

In block 1004, the item display module 118 presents a sub-collection of item representations in the item presentation region 106, e.g., corresponding to the position of the slider member.

In block 1006, the item display module 118 can optionally vary information presented in the scrolling region 108 based on the position of the slider member. For example, as shown in FIG. 6, the item display module 118 can display enhanced information 610 associated with the items that are associated with a window defined by the slider member 608. Alternatively, or in addition, the item display module 118 can accentuate information that is already present in the scrolling region 606.

C. Representative Processing Functionality

FIG. 11 sets forth illustrative electrical data processing functionality 1100 that can be used to implement any aspect of the functions described above. With reference to FIGS. 1 and 2, for instance, the type of processing functionality 1100 shown in FIG. 11 can be used to implement any aspect of the item processing system 102. In one case, the processing functionality 1100 may correspond to any type of computing device that includes one or more processing devices.

The processing functionality 1100 can include volatile and non-volatile memory, such as RAM 1102 and ROM 1104, as well as one or more processing devices 1106. The processing functionality 1100 also optionally includes various media devices 1108, such as a hard disk module, an optical disk module, and so forth. The processing functionality 1100 can perform various operations identified above when the processing device(s) 1106 executes instructions that are maintained by memory (e.g., RAM 1102, ROM 1104, or elsewhere). More generally, instructions and other information can be stored on any computer readable medium 1110, including, but not limited to, static memory storage devices, magnetic storage devices, optical storage devices, and so on. The term computer readable medium also encompasses plural storage devices. The term computer readable medium also encompasses signals transmitted from a first location to a second location, e.g., via wire, cable, wireless transmission, etc.

The processing functionality 1100 also includes an input/output module 1112 for receiving various inputs from a user (via input modules 1114), and for providing various outputs to the user (via output modules). One particular output mechanism may include a presentation module 1116 and an associated graphical user interface (GUI) 1118. The processing functionality 1100 can also include one or more network interfaces 1120 for exchanging data with other devices via one or more communication conduits 1122. One or more communication buses 1124 communicatively couple the above-described components together.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for presenting an information-enhanced scrolling region using an electronic item processing system, comprising:

identifying a collection of items, the items being organized into a plurality of containers arranged in a hierarchical structure;

processing the collection of items by expanding the collection of items into a flattened hierarchy;

displaying an item user interface presentation using a processor, the item user interface presentation including:

an item presentation region that displays representations of the collection of items; and a scrolling region that enables a user to navigate through the representations of the collection of items displayed in the item presentation region, the scrolling region displaying scrolling-region information comprising a list of informative labels regarding the flattened hierarchy that identify sub-collections of items within the collection of items, wherein the scrolling region is separate from the item presentation region and includes a slider member, and a position of the slider member selects at least one of the informative labels identifying at least one of the sub-collection of items within the collection of items; and displaying representations of the at least one sub-collection of items in the item presentation region based on the position of the slider member;

wherein the position of the slider member selects a first one of the informative labels that identifies a first sub-collections of items within the collection of items, the method further comprising:

identifying a second informative label that is not selected by the slider member but precedes or follows the first informative label, the second informative label identifying a second sub-collection of items within the collection of items; and displaying at least some of the second sub-collection of items in the item presentation region along with the first sub-collection of items.

2. The method of claim 1, wherein each item in the collection of items corresponds to a respective file-type item or a respective component-type item within a more encompassing item or items.

3. The method of claim 1, further comprising modifying the item user interface presentation, based on the position of the slider member, to render enhanced scrolling-region information, wherein the enhanced scrolling-region information is associated with a selected sub-collection of items identified by the selected informative label.

4. The method of claim 3, wherein the enhanced scrolling-region information comprises at least one of:

metadata associated with the selected sub-collection of items; or an indication of a number or size of the selected sub-collection of items.

5. The method of claim 1, wherein a span of the scrolling-region information exceeds a span of the scrolling region, further comprising changing a portion of the scrolling-region information that is displayed in the scrolling region based on a position of the slider member within the scrolling region.

6. The method of claim 1, wherein said processing further comprises identifying at least one emphasis-related attribute associated with the collection of items, and wherein said displaying further comprises modulating the representation of at least one of the items displayed in the item presentation region, based on said at least one emphasis-related attribute.

7. The method of claim 6, wherein said modulating comprises a east one of:
adjusting a degree of highlighting, applied to the representation of the at least item, relative to at least one other representation displayed in the item presentation region; or
adjusting a size of the representation of the at least item relative to at least one other representation displayed in the item presentation region.

8. The method of claim 1, wherein the position of the slider member selects at least two of the informative labels identifying at least two of the sub-collection of items, and wherein representations of the at least two sub-collections of items is displayed in the item presentation region.

9. A method for presenting an information-enhanced scrolling region using an electronic item processing system, comprising:
identifying a collection of items, the items being organized into a plurality of containers arranged in a hierarchical structure;
processing the collection of items by expanding the collection of items into a flattened hierarchy;
displaying an item user interface presentation using a processor, the item user interface presentation including:
an item presentation region that displays representations of the collection of items; and
a scrolling region that enables a user to navigate through the representations of the collection of items displayed in the item presentation region, the scrolling region displaying scrolling-region information comprising a list of informative labels regarding the flattened hierarchy that identify sub-collections of items within the collection of items wherein the scrolling region is separate from the item presentation region and includes a slider member, and a position of the slider member selects at least one of the informative labels identifying at least one of the sub-collection of items within the collection of items, wherein said displaying further comprises presenting background information in the scrolling region, the background information metaphorically underlying at least some of the informative labels, the visual appearance of the background information being varied based on at least one attribute associated with the collection of items; and
displaying representations of the at least one sub-collection of items in the item presentation region based on the position of the slider member.

* * * * *